(12) United States Patent
Matsunaga (10) Patent No.: US 7,660,325 B2
(45) Date of Patent: Feb. 9, 2010

(54) COMMUNICATION CONTROL APPARATUS FOR ADJUSTING A TRANSMISSION TIMING WITH A TIMING VARIATION, AND METHOD THEREFOR

(75) Inventor: Toshihiko Matsunaga, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 631 days.

(21) Appl. No.: 11/452,904

(22) Filed: Jun. 15, 2006

(65) Prior Publication Data

US 2007/0002816 A1 Jan. 4, 2007

(30) Foreign Application Priority Data

Jun. 17, 2005 (JP) .............................. 2005-177944

(51) Int. Cl.
*H04L 12/413* (2006.01)
(52) U.S. Cl. ..................... 370/445; 370/350; 370/503
(58) Field of Classification Search ............... 370/445, 370/503, 350
See application file for complete search history.

(56) References Cited

U.S. PATENT DOCUMENTS 6,111,872 A * 8/2000 Suematsu et al. ........... 370/350

2003/0194972 A1* 10/2003 Harada et al. ................ 455/69
2005/0105504 A1* 5/2005 Sakoda ....................... 370/349
2005/0190796 A1 9/2005 Date et al.

FOREIGN PATENT DOCUMENTS

JP 2005-94663 4/2005

OTHER PUBLICATIONS

Y. Matsushita et al., "Wireless LAN Architecture" Kyoritsu Shuppan Co., Ltd., Tokyo, Japan, pp. 47, 53-59 and 69 (1996).

* cited by examiner

*Primary Examiner*—Jason E Mattis
*Assistant Examiner*—Kibrom T Hailu
(74) *Attorney, Agent, or Firm*—Venable LLP; Michael A. Sartori; Kyle D. Petaja (57) ABSTRACT

A communication control apparatus is included in each of nodes constituting a telecommunications system and includes a communication timing signal transmitter/receiver for receiving a communication timing signal representative of a transmission timing of a data signal from at least one neighboring node neighboring the own node, and transmitting the communication timing signal of the own node. In the apparatus, a communication timing determining circuit determines a transmission timing of the communication timing signal of the own node in accordance with basic rate information, which defines a transmission timing of the communication timing signal of the own node, and the communication timing signal received from the neighboring node. A basic rate information control circuit included in the apparatus controls the basic rate information used by the communication timing determining circuit.

9 Claims, 10 Drawing Sheets

COMMUNICATION CONTROL APPARATUS FOR ADJUSTING A TRANSMISSION TIMING WITH A TIMING VARIATION, AND METHOD THEREFOR

BACKGROUND OF THE INVENTION

1. Field of the Invention

The present invention relates to a communication control apparatus and a method therefor. More specifically, the present invention relates to a communication control apparatus and a method therefor advantageously applicable to a telecommunications system capable of controlling transmission timings in order to prevent data from colliding between a plurality of nodes spatially distributed or mounted on mobile bodies.

2. Description of the Background Art

A TDMA (Time Division Multiple Access) system and CSMA (Carrier Sense Multiple Access) systems represented by a CSMA/CA (Carrier Sense Multiple Access with Collision Avoidance) system and a CSMA/CD (Carrier Sense Multiple Access with Collision Detection) system are available for allowing a plurality of spatially distributed nodes to transmit and receive data without any collision, as taught in Y. Matsushita et al. "Wireless LAN Architecture", Kyoritsu Shuppan Co., Ltd., Tokyo, Japan, 1996, pp. 47, 53-59 and 69.

However, the TDMA system has a problem that when an error occurs in the central node expected to allot time slots to fail, the entire telecommunications system goes down. In order to solve this problem, Japanese patent laid-open publication No. 2005-94663, for example, proposes a method of obviating a collision between transmitted data by causing the individual nodes to mutually adjust the allotment of time slots in a distributed coordination fashion without resorting to a central control server. For such mutual adjustment, each node interacts with neighboring nodes by transmitting and receiving periodic impulse signals or communication timing signals.

More specifically, by using mathematic expressions modeling nonlinear oscillation, each node adjusts its own timing for the transmission of an impulse signal in accordance with the timing at which another node transmits an impulse signal. With this adjustment scheme, the individual nodes execute mutual adjustment such that the transmission timing of an impulse signal from the own node and the transmission timing of an impulse signal from another node are apart from each other as far as possible, implementing the allotment of time slots by distributed coordination.

On the other hand, a radio communications network or telecommunications system is unable to detect collisions of electromagnetic waves, and therefore causes, when timing signals are sent at the same time, nodes or terminals to receive no electromagnetic waves, thus obstructing correct allotment of time slots. Consequently, data cannot be sent by the nodes of the type allotting time slots by distributed coordinated coordination, as sated above.

In light of the above, a beacon signal may be radiated to the nodes from a station other than the nodes at predetermined intervals, so that the nodes can establish synchronization between them in response to the beacon signal. This scheme, however, is not practicable without resorting to a special beacon station.

Moreover, because the propagation distance of a signal wave cannot be accurately controlled, it is likely that although a node can receive a signal sent from another node, a signal sent by the former does not reach the latter, resulting in an idle time slot.

SUMMARY OF THE INVENTION

It is an object of the present invention to provide a communication control apparatus and a method therefor allowing each node to surely, autonomously transmit and receive communication control signals to and from a neighboring node and calculating a transmission timing of a data signal with accuracy.

A communication control apparatus of the present invention is included in each of a plurality of nodes constituting a telecommunications system and includes a communication timing signal transmitter/receiver for receiving a communication timing signal representative of the transmission timing of a data signal from at least one neighboring node neighboring the own node including the communication timing signal transmitter/receiver, and transmitting the communication timing signal of the own node. A communication timing determining circuit in the control apparatus determines the transmission timing of the communication timing signal of the own node in accordance with basic rate information, which defines the transmission timing of the communication timing signal of the own node, and the communication timing signal received from the neighboring node. In the apparatus, a basic rate information control circuit controls the basic rate information used by the communication timing determining circuit.

A communication control method, a node and a telecommunications system are also disclosed in accordance with the invention.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

A preferred embodiment of the communication control apparatus in accordance with the present invention will be described hereinafter. The illustrative embodiment is applied to a telecommunications system that allows each communication node to emit an impulse signal while effectively sensing impulse signals emitted from other communication nodes neighboring the former so as to interact with the neighboring nodes, thereby causing the nodes to allot time slots in a distributed coordination fashion.

Figure 2:
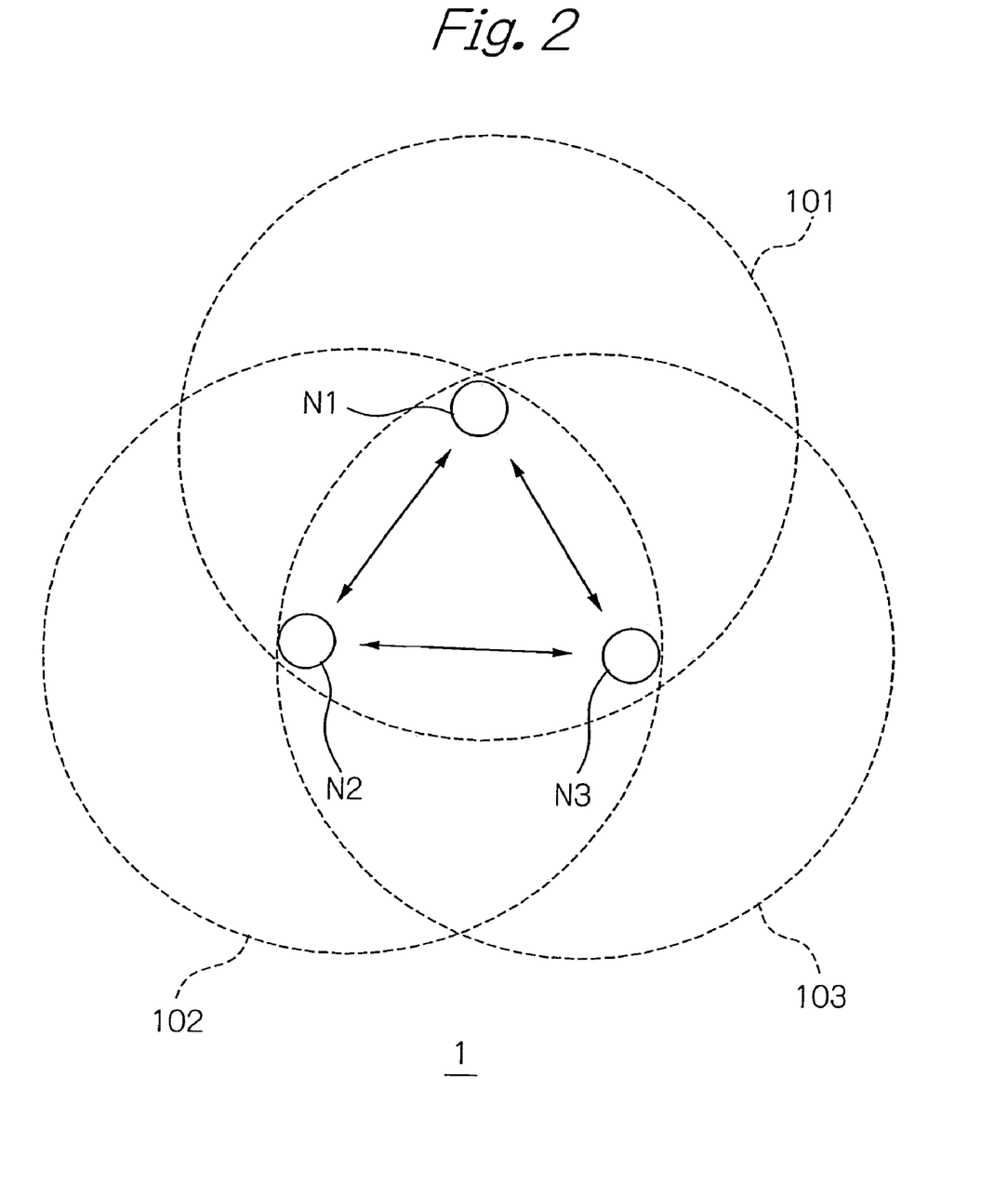
FIG. 2 shows a positional relation between a plurality of nodes included in the preferred embodiment.

Referring first to FIG. 2 of the accompanying drawings, a specific positional relation between nodes constitutes a radio communications network in accordance with the illustrative embodiment. As shown, three communication nodes or radio communication terminals N1, N2 and N3 are assumed to be located at position where they can receive radio data signals from the other nodes each. The ranges the nodes N1, N2 and N3 can receive electromagnetic waves transmitted from neighboring one of the nodes are depicted with dotted circles 101, 102 and 103, respectively. The description of the illustrative embodiment to be made later will concentrate on the node N1 by way of example.

Figure 1:
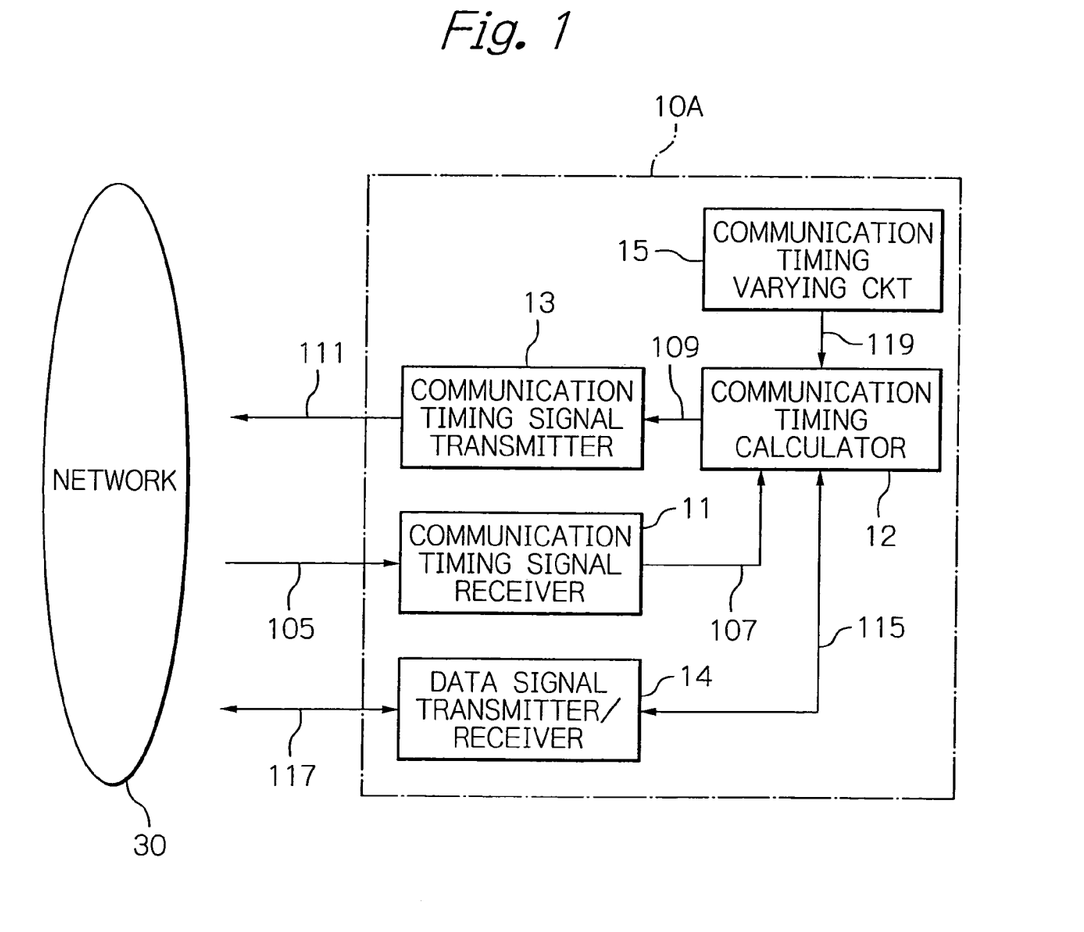
FIG. 1 is a schematic block diagram showing a specific configuration of a node included in a preferred embodiment of the present invention.

FIG. 1 shows the configuration of a node or terminal 10A included in a communication system embodying the present invention and corresponding to any one of the nodes N1 through N3, FIG. 2. As shown, the node 10A includes a transmission timing signal receiver or impulse signal receiver 11, a transmission timing calculator 12, a communication timing signal transmitter or impulse signal transmitter 13, a data signal transmitter/receiver 14 and a communication timing varying circuit 15, which are interconnected as illustrated.

The communication timing signal receiver 11 receives a communication timing signal or impulse signal 105 transmitted from a neighboring node, which may be another node existing in a range, such as ranges 101, 102 and 103, over which an electromagnetic wave emitted from the node 10A can be propagated. It is to be noted that the communication timing signal or impulse signal refers to a signal transmitted and received as a communication timing signal and has a Gaussian distribution or similar impulse waveform. The communication timing may sometimes be referred to as transmission timing. The communication timing signal 105 may or may not include destination information. The communication timing signal receiver 11 delivers to the communication timing calculator 12 the received impulse signal itself, an impulse signal 107 produced by shaping the waveform of the received impulse signal or an impulse signal regenerated on the basis of the received impulse signal 105.

The transmission timing calculator 12 generates a phase signal 109, which defines the transmission timing of the node 10A, in response to the received signal 107 input from the communication timing signal receiver 11. Assuming that the node 10A is a node i and that the phase signal of the node i has a value of $\theta_i(t)$ at a time t, the transmission timing calculator 12 varies the phase signal $\theta_i(t)$ by each variation represented by an expression (1):

$$d\,\theta_i(t)/dt = \omega + \sum_{k=1}^{N} P_k(t) \cdot R(\theta_i(t),\,\sigma(t)), \qquad (1)$$

where $\theta_i(t)$ denotes the phase signal of the node i, $\omega$ denotes a specific angular frequency parameter, $P_k(t)$ denotes a impulse signal received from a neighboring node, and $R(\theta_i(t), \sigma(t))$ denotes a phase response function.

The expression (1) is representative of a rule for varying the nonlinear oscillation rhythm of the phase signal $\theta_i(t)$ of the own node i in accordance with the signal 107 input from the communication timing signal receiver 11. In the expression (1), the first member $\omega$ of the right side, denoting a specific angular frequency parameter, is representative of a basic variation rhythm assigned to all nodes constituting the network and corresponding to the basic rate of transition of the own operation state while the second member of the right side is representative of a nonlinear variation. In the illustrative embodiment, the specific oscillation frequency parameter $\omega$ is the same throughout the telecommunications system 1 at the initial stage.

In the illustrative embodiment, the specific oscillation frequency parameter $\omega$ is varied by the communication timing varying circuit 15, as will be described in detail later.

A function $P_k(t)$ is representative of a signal output from the communication timing signal receiver 11 in response to a communication timing signal 105 received from a neighboring node k, which is a natural number between 1 and N. A function $R(\theta_i(t), \sigma(t))$ is a phase response function expressing a response characteristic that causes the basic rhythm of the node i to vary in response to a communication timing signal received from another node; this function accords to, e.g., the following expression (2):

$$R(\theta_i(t), \sigma(t)) = \sin(\theta_i(t) + \sigma(t))$$

$$\sigma(t) = \pi + \phi(t), \qquad (2)$$

where $\phi(t)$ denotes a random noise function.

The expression (2) indicates that the phase response function is determined by the sinusoidal wave of a phase value produced by superposing random noise on the phase opposite to the phase signal $\theta_i(t)$ at the time t. With this configuration, the illustrative embodiment realizes a nonlinear characteristic that causes nearby nodes to tend to become opposite in phase (inversion of an oscillation phase) to each other and uses such a characteristic to avoid collisions. More specifically, the illustrative embodiment establishes a suitable time relation or time lag in order to prevent the transmission timings of communication timing signals sent from neighboring nodes from colliding with each other.

In the expression (2), a constant term $\pi$ [rad], expressing the function $\sigma(t)$, implements the nonlinear characteristic that causes nearby nodes to tend to become opposite in phase while the random noise function $\sigma(t)$, which accords to, e.g., a Gaussian distribution with a mean value of zero, provides the nonlinear characteristic with random variability. The random variability copes with an occurrence that the system fails to reach the target stable state or optimum solution and falls in another stable state or local solution.

While the expression (2) uses a sine function as the simplest example of the phase response function $R(\theta_i(t), \sigma(t))$, use may be made of any other suitable function as a phase response function. If desired, the constant term $\pi$ of the function $\sigma(t)$ may be replaced with any other suitable constant λ(0<λ<2π), in which case nearby nodes tend to become different in phase from each other instead of becoming opposite in phase to each other.

The function of the communication timing calculator 12 will be described more specifically with reference to FIGS. 3A through 3C and 4A through 4C hereinafter. It should be noted that status transitions shown in FIGS. 3A through 4C are related to the function of the communication timing signal transmitter 13 as well. Paying attention to a given node, FIGS. 3A through 4C demonstrate a relation between a node of interest or own node and another node or neighboring node, i.e., how a phase relation between the nonlinear oscillation rhythms of the two nodes varies with the elapse of time.

Figure 3A:
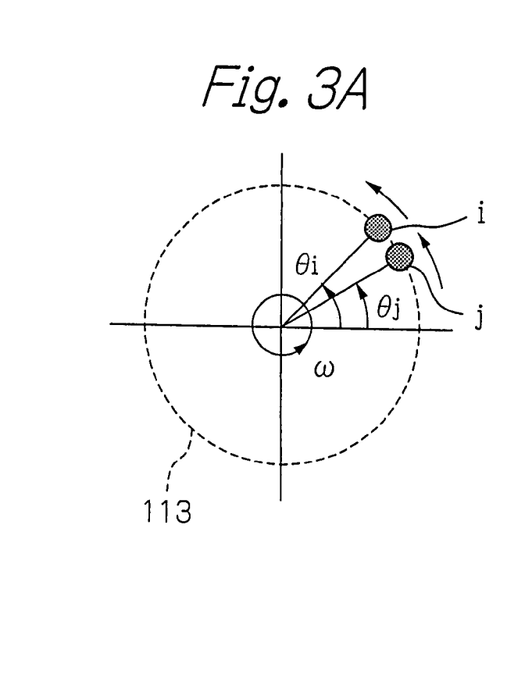
FIGS. 3A, 3B and 3C demonstrate a specific condition in which two nodes are tuned to each other.
Figure 3B:
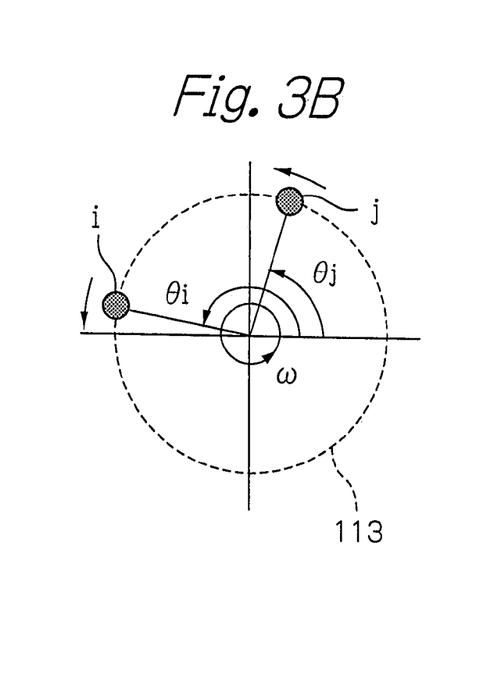
Figure 3C:
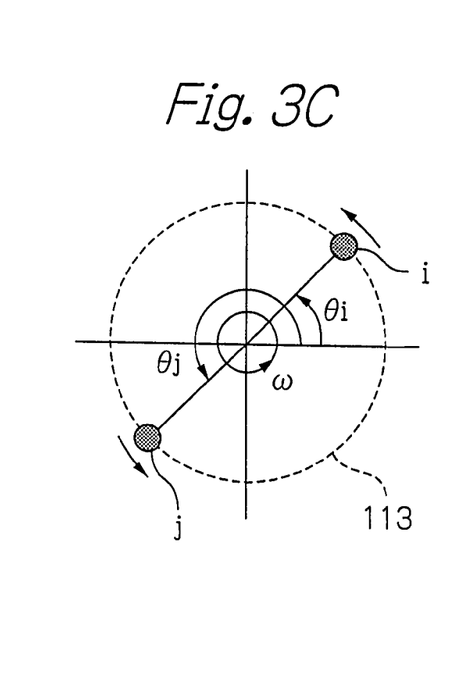

FIG. 3A through 3C show a specific case wherein a node of interest or own node i and a single node j adjoining it exist together. In FIGS. 3A through 3C, two material points, rotating on a circle 113, are respectively representative of the nonlinear oscillation rhythm of the node of interest i and that of the neighboring node j. The angles $\theta_i$ and $\theta_j$ of the material points i and j, respectively, on the circle 113 are representative of the instantaneous values of phase signals. The circular movements of the material points i and j are projected onto the ordinate or the abscissa to represent the respective nonlinear oscillation rhythms. The two material points i and j tend to become opposite in phase to each other in accordance with the operation represented by the expressions (1) and (2). As a result, even if the phases of the two material points i and j are close to each other, as shown in FIG. 3A, the status varies as the time elapses via a transition state shown in FIG. 3B to a stable state shown in FIG. 3C in which the phase difference between the two points i and j is substantially equal to pi, π.

The two material points i and j rotate at the primary angular velocity equal to the respective specific angular oscillation frequency parameter ω. When the two nodes become interactive in response to communication timing signals transmitted therebetween, the two points i and j vary the angular velocity thereof ahead or behind so as to ultimately establish the stable state at which the appropriate relation is maintained. This operation may be considered to indicate that the two points i and j repel each other while rotating to establish the stable phase relation. In the stable state, FIG. 3C, if each of the two nodes is in a predetermined phase, e.g., zero, to transmit the output communication timing signal 111, FIG. 1, then both nodes are brought into the transmission timing to establish the appropriate timing relation with each other.

Figure 4A:
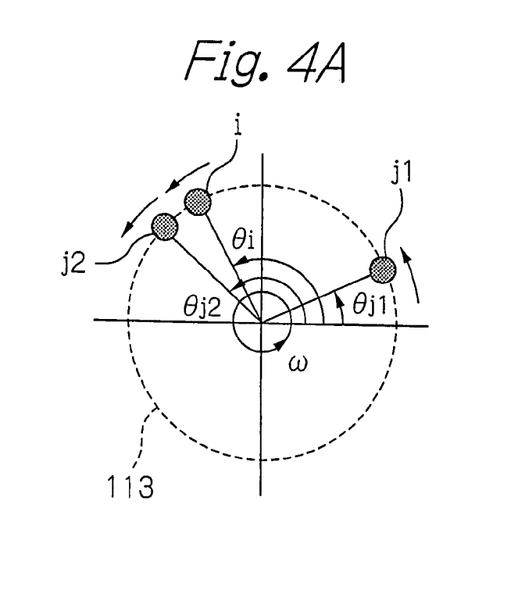
FIGS. 4A, 4B and 4C demonstrate another specific condition in which three nodes are tuned to each other.
Figure 4B:
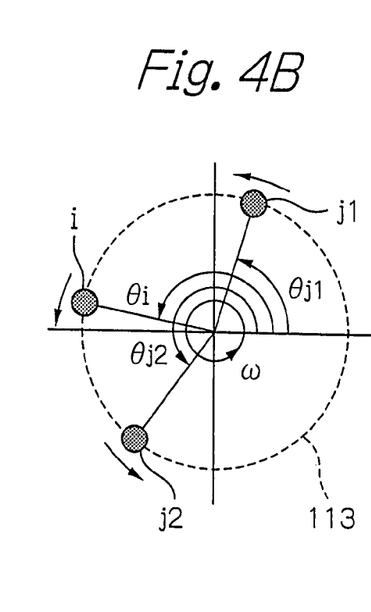
Figure 4C:
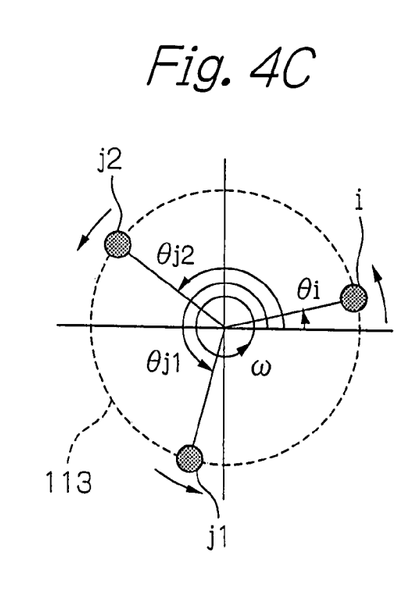

FIGS. 4A through 4C show another specific case wherein the own node i and two neighboring nodes j1 and j2 exist together. In this case, too, the material points i, j1 and j2 repel each other while in rotation, establishing the stable phase relation with respect to time. This is also true when three or more nodes neighbor the node of interest i.

The stable phase relation or stable state thus established is, in nature, remarkably adaptive to a change in the number of neighboring nodes, i.e., remarkably flexible. For example, assume that when a single node j1 neighbors the node of interest i in its stable phase relation or stable state, another neighboring node j2 is added. Then, although the stable state is once disturbed, a new stable state is again established with the node of interest i and two neighboring nodes j1 and j2 via its transition state. This is also true when either one of the neighboring nodes j1 and j2 disappears or fails due to an error or similar cause having occurred therein.

Referring again to FIG. 1, the communication timing calculator 12 delivers the phase signal $\theta_i(t)$ determined to the communication timing signal transmitter 13 and data signal transmitter/receiver 14, as depicted with connections 109 and 115, respectively.

In response to the phase signal $\theta_i(t)$, the communication timing signal transmitter 13 transmits a communication timing signal 111. More specifically, when the phase signal $\theta_i(t)$ reaches a predetermined phase α (0≦α<2π), the communication timing signal transmits a communication timing signal 111. The predetermined phase α should preferably be uniform in the entire telecommunications system 1 and will be assumed to be zero hereinafter for the purpose of description. In the state shown in FIG. 3C, because the phase signals of the nodes i and j differ in phase from each other by π in the stable state, the transmission timings of output transmission timing signals 111 from the node i and j are shifted from each other by π despite that α is uniform in the entire system 1.

The data signal transmitter/receiver 14 receives data from another node or transmits data to be transmitted from or relayed by the own node, as shown with a connection 117 in the figure. More specifically, the data signal transmitter/receiver 14 executes data transmission in a time slot, which will be described later, if the mutual adjusting of the transmission timing of a communication timing signal 111 between the own node and a neighboring node is in the stable state shown in FIG. 3C or 4C or stops data transmission if the above mutual adjustment is in the transition state shown in FIG. 3B or 4B.

In the illustrative embodiment, the time slot mentioned above has its period of time over which the phase signal $\theta_i(t)$ remains in the range of, e.g., $\delta 1 \leq \theta_i(t) \leq \beta 1 - \delta 2$. The start point of the time slot at which the phase signal is assumed to have the above value δ1 is a time when the transmission of a communication timing signal 111 ends. On the other hand, the end point of the time slot at which the phase signal is assumed to have the value equal to β1−δ2 is a time preceding the timing of the first communication timing signal in every period of the phase signal by some offset δ2. The values δ1 and δ2 are representative of a phase width corresponding to an extremely short or minute period of time for compensating for an occurrence that a communication timing signal whose source includes both the own node and another node and a data signal whose source includes both the own node and another node do not exit at the same time in the radio space around the node 10A. The values δ1 and δ2 may be determined by experiments in conditions in which the node 10A is actually located.

For example, in the stable state shown in FIG. 3C, the node i starts transmitting a communication timing signal 111 when the phase $\theta_i$ is 0, ends transmitting the communication timing signal 111 before the phase $\theta_i$ becomes $\delta_1$, starts transmitting a data signal 117 when the phase $\theta_i$ is $\delta_1$, ends transmitting the data signal 117 when the phase $\theta_i$ becomes $\beta_i - \delta_2$ ($\beta_1 \approx \pi$), and then stops transmitting both the transmission timing signal 111 and data signal 117 until the phase θ again becomes 0. While the other node operates in the same manner as the own node on the basis of the phase $\theta_j$, the operation of the other node does not collide with the operation of the own node because the phases $\theta_i$ and $\theta_j$ are shifted from each other by substantially π, as stated previously.

The communication timing varying circuit 15 provides the communicating timing calculator 14 with the basic period or transmission interval of the communication timing signal, as depicted with a connection 119. More specifically, assuming that the basic period of the communication timing signal is T, the communication timing varying circuit 15 adds or subtracts an extremely small or minute value ΔT to or from the basic period T to thereby prevent communication timings with other nodes or terminals from fully coinciding with each other. This successfully shifts the transmission periods of a plurality of nodes N1 through N3 coincident with each other for thereby obviating the collision of electromagnetic waves.

The method of varying the communicating timing stated above is only illustrative and may be replaced with any other suitable method. For example, the correcting method, based on the receipt timing of a communicating timing signal from another node may be varied between the nodes N1 through N3.

Figure 5:
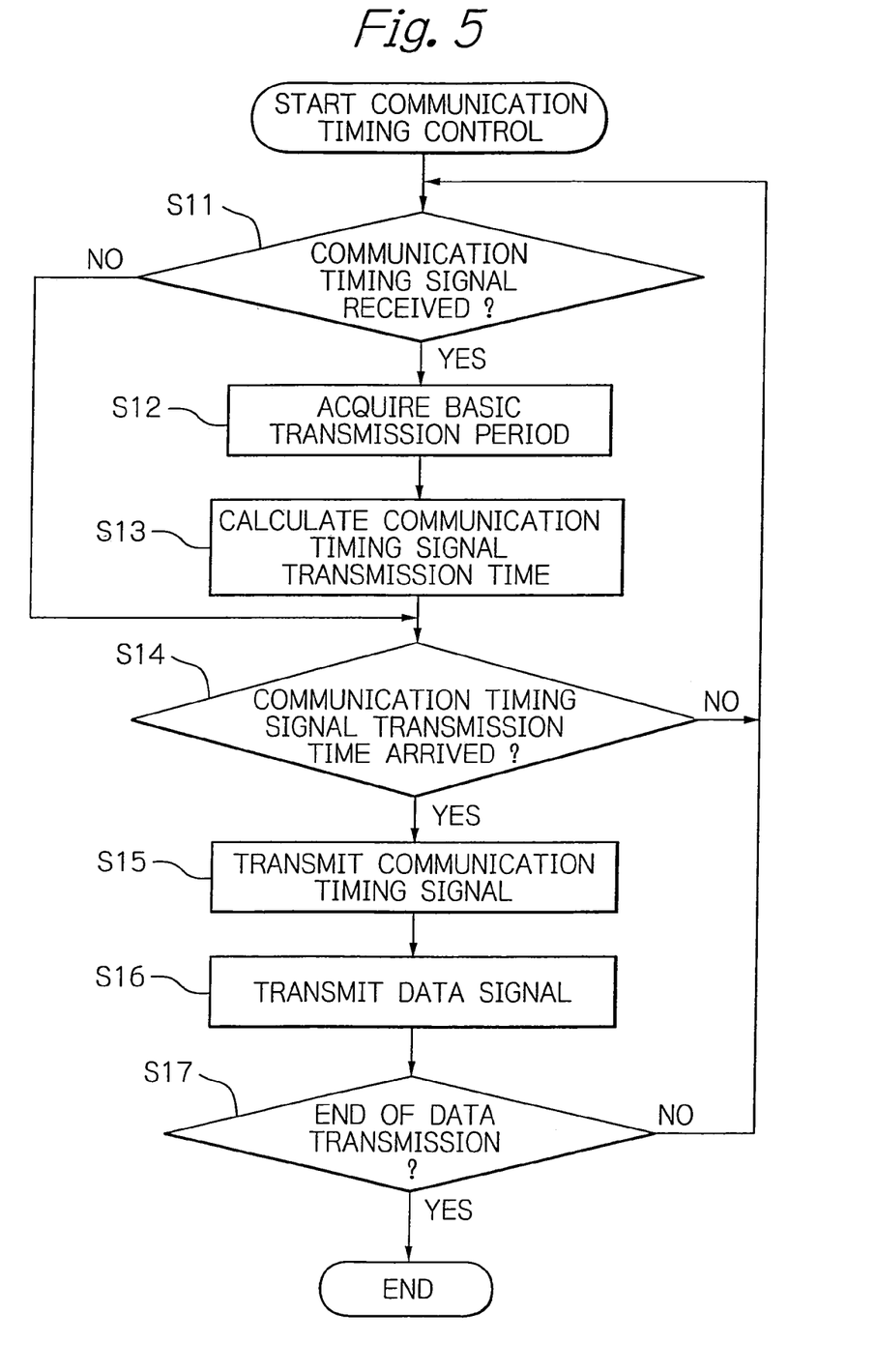
FIG. 5 is a flowchart demonstrating a specific communication timing control procedure unique to the illustrative embodiment.
Figure 6A:
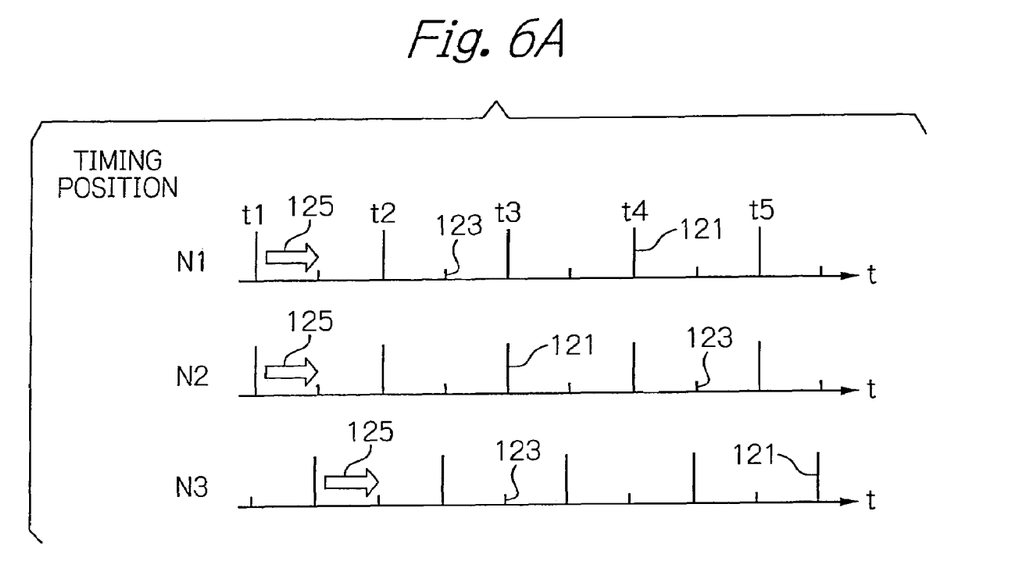
FIGS. 6A and 6B are timing charts showing the allotment of time slots between the nodes included in the illustrative embodiment.
Figure 6B:
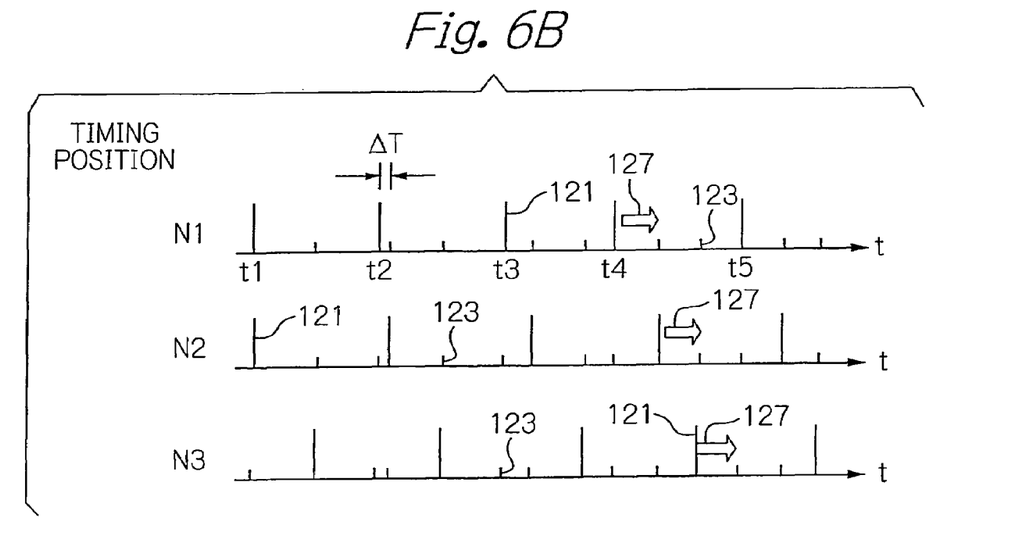

Reference will be made to FIGS. 5, and 6A and 6B for describing a specific communication timing control procedure unique to the telecommunications system 1 of the illustrative embodiment. FIG. 5 is a flowchart demonstrating how the node or terminal 10A, FIG. 1, controls the communication timing while FIGS. 6A and 6B are timing charts showing transmission/receipt timings of communication timing signals 111 and 105 effected between the nodes N1 through N3. In the description, signals are designated with reference numerals of connections on which they appear.

The communicating timing calculator 12 monitors a transmission buffer, not shown, included in the data signal transmitter/receiver 14 and calculates, if any data signal to be transmitted is present in the buffer, the transmission time of a communication timing signal 111 for transmitting the data signal 117. As shown in FIG. 5, when the communication timing calculator 12 starts counting the transmission time of a communication timing signal, the communication timing signal transmitter/receiver 14 determines whether or not a transmission timing signal from another node is received (step S11).

If the answer of the step S11 is negative, NO, meaning that a transmission timing signal 105 from another node is not received, the communication timing signal receiver 11 determines whether or not the transmission time calculated by the communication timing calculator 12 has arrived (step S14). On the other hand, if the answer of the step S11 is positive, YES, the communication timing signal receiver 11 produces information representative of a time lag between the transmission time of a communication timing signal 111 from the own node 10A and the time of receipt and feeds the information over the connection 107 to the communication timing calculator 12. At this instant, information representative of the basic transmission period, corresponding to the specific angular oscillation frequency parameter ω, is also input from the communication timing varying circuit 15 on the connection 119 to the communication timing calculator 12 (step S12).

It is to be noted that the information representative of the basic transmission period refers to the basic transmission period T itself or time information produced by adding or subtracting the extremely small value ΔT to or from the basic period T. The value ΔT refers to a period of time far shorter than the basic transmission period T and should only be able to distinguish a plurality of communication timing signals which may be continuously input to the communication timing signal receiver 11.

In the stable state, the communication timing varying circuit 15 provides the communication timing calculator 12 with thee different basic period information, i.e., T−ΔT, T and T+ΔT and causes it to calculate transmission times, so that a transmission timing signal is sent in any one of the resulting periods. For example, if the basic period T is 0.1 second while the variation ΔT is shorter than 0.01 second inclusive, then a transmission timing signal is transmitted in any one of three different periods of 0.09 second, 0.1 second and 0.11 second.

On receiving the basic transmission period information, the communication timing calculator 12 corrects the basic frequency with the time lag information 107 received from the communication timing signal receiver 11 for thereby determining a transmission time at which the next communication timing signal 111 should be transmitted from the own node (step S13).

When the transmission time thus calculated by the communication timing calculator 12 arrives (YES, step S14), the transmission timing signal transmitter 13 transmits a communication timing signal 111 (step S15). If the above transmission time has not arrived (NO, step S14), the procedure returns to the step S11. After the transmission of a transmission timing signal 111 (step S15), a data signal 117 is transmitted during the interval between the time of transmission and the receipt of a communication timing signal 105 from another node (step S16).

For example, FIG. 6A shows the conventional transmission and receipt timings in which the basic period would not be varied; longer vertical bars 121 and shorter vertical bars 123 are representative of transmission and receipt, respectively. As for each of the nodes N1 through N3, a period of time between the transmission of a communication timing signal 111 from the own node and the receipt of a communication timing signal 105 from another node, i.e., the interval 125 between each longer vertical bar 121 and the shorter vertical bar 123 following it is assumed to be a time slot assigned to the own node for the transmission of a data signal 117.

In the specific condition shown in FIG. 6A, the nodes N1 and N2 have transmission times of communication timing signals 111 coincident at a time t1 and have the same basic period. It will therefore be seen that data signals 117 transmitted from the two nodes N1 and N2 would collide with each other. Because a radio communications network 1 would be unable to detect such a collision of data signals 117, the nodes N1 and N2 each could not sense the communication timing signal 105 sent from the other node with the result that the collision repeatedly would occur at consecutive times t2, t3 and so forth.

FIG. 6B shows a specific condition in which the basic period of the individual node is varied in accordance with the illustrative embodiment. As shown, at the time t1, the nodes N1 and N2 both are transmitting the respective transmission timing signals 111 and therefore calculating transmission timings of the respective communication timing signals 111 without giving consideration to each other.

However, at the time t2, the nodes N1 and N2 vary the respective basic period of a communication timing signal 111 between T−ΔT and T+ΔT each, transmitting communication timing signals 111 at times different from each other. Consequently, each node N1 or N2 can receive the communication timing signal 105 transmitted from the other node N2 or N1. It follows that a data signal 117 can be transmitted during a time interval produced by subtracting the variation ΔT from the time slot width.

Subsequently, the node N1 shortens its period while the node N2 extends its period, thereby shifting their communication timing signal transmission timings. Thereafter, the nodes N1 and N2 start transmitting communication timing signals 111 alternately with each other at the consecutive times t3, t4, t5 and so forth. The node N1 transmits a data signal 117 before the terminal N2 transmits a communication timing signal 111 while the node N2 transmits a data signal 117 between the time when it transmits the above communication timing signal 111 and the time when the node N3 transmits a communication timing signal 111, so that the data signals 117 sent from the nodes N1 and N2 are prevented from colliding with each other.

The procedure described above is repeated until all data present in the data signal transmitter/receiver 14 have been transmitted (step S17).

As stated above, the illustrative embodiment causes each node or terminal to not only control the receipt timing of a communication timing signal 105 from another node, but also control the transmission timing of its own communication timing signal 111 in accordance with the variation ΔT determined by the communication timing varying circuit 15, preventing the transmission of the communication timing signals 111 from the nodes from being continuously coincident at consecutive times. This successfully obviates the overlap of time slots 127 assigned to different nodes and therefore the collision of data signals 117.

An alternative embodiment of the present invention will be described with reference to FIG. 7 hereinafter. The illustrative embodiment, like the previous embodiment, is applied to a telecommunications system that allows each node to emit a communication timing signal or impulse signal 111 while effectively sensing impulse signals 105 emitted from other nodes so as to interact with neighboring nodes, thereby causing the nodes to allot time slots in a distributed coordination fashion.

Figure 7:
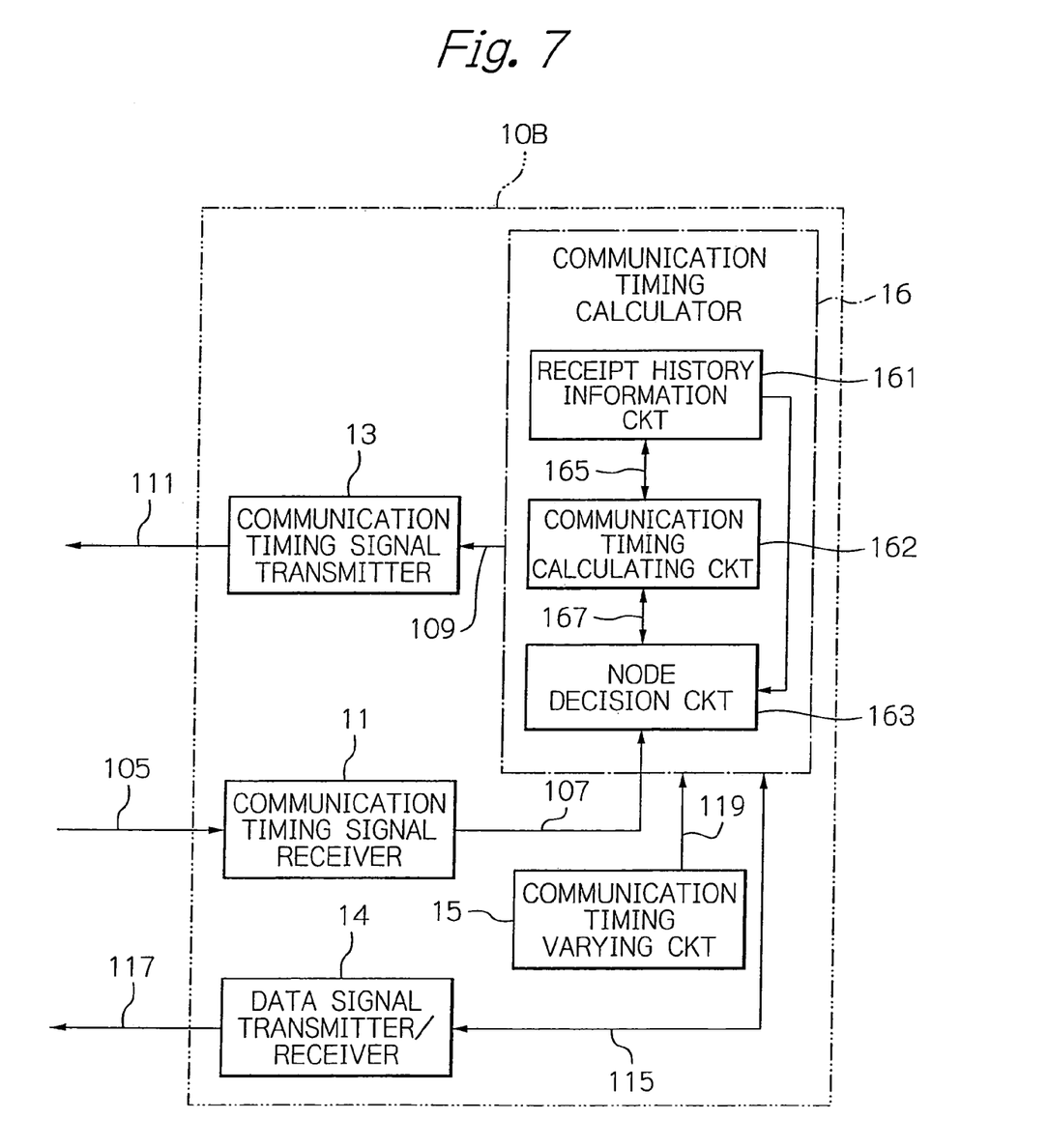
FIG. 7 is a schematic block diagram showing node representative of an alternative embodiment of the present invention.

As shown in FIG. 7, a node 10B included in the illustrative embodiment may be identical with the node 10A, FIG. 1, except that a communication timing calculator 16 is substituted for the communication timing calculator 12. The following description will therefore concentrate on the configuration of the communication timing calculator 16. Like parts and elements are designated by identical reference numerals, and detailed description thereof will not be repeated in order to avoid redundancy.

The communication timing calculator 16 includes a receipt history information circuit 161 and a node or terminal decision circuit 163 as well as a communication timing calculating circuit 162, which are interconnected as illustrated.

The receipt history information circuit 161 manages time lag information input from the communication timing signal receiver 11 as depicted with a connection 165 in the form of history on a node-by-node basis. The node decision circuit 163 determines whether or not a received signal is a communication timing signal 105. The node decision circuit 163 is adapted to feed, as depicted with a connection 167, receipt information to the communication timing calculator 162 if the received signal is a communication timing signal 105, or otherwise discard the received signal by determining that the received signal is noise.

Figure 8:
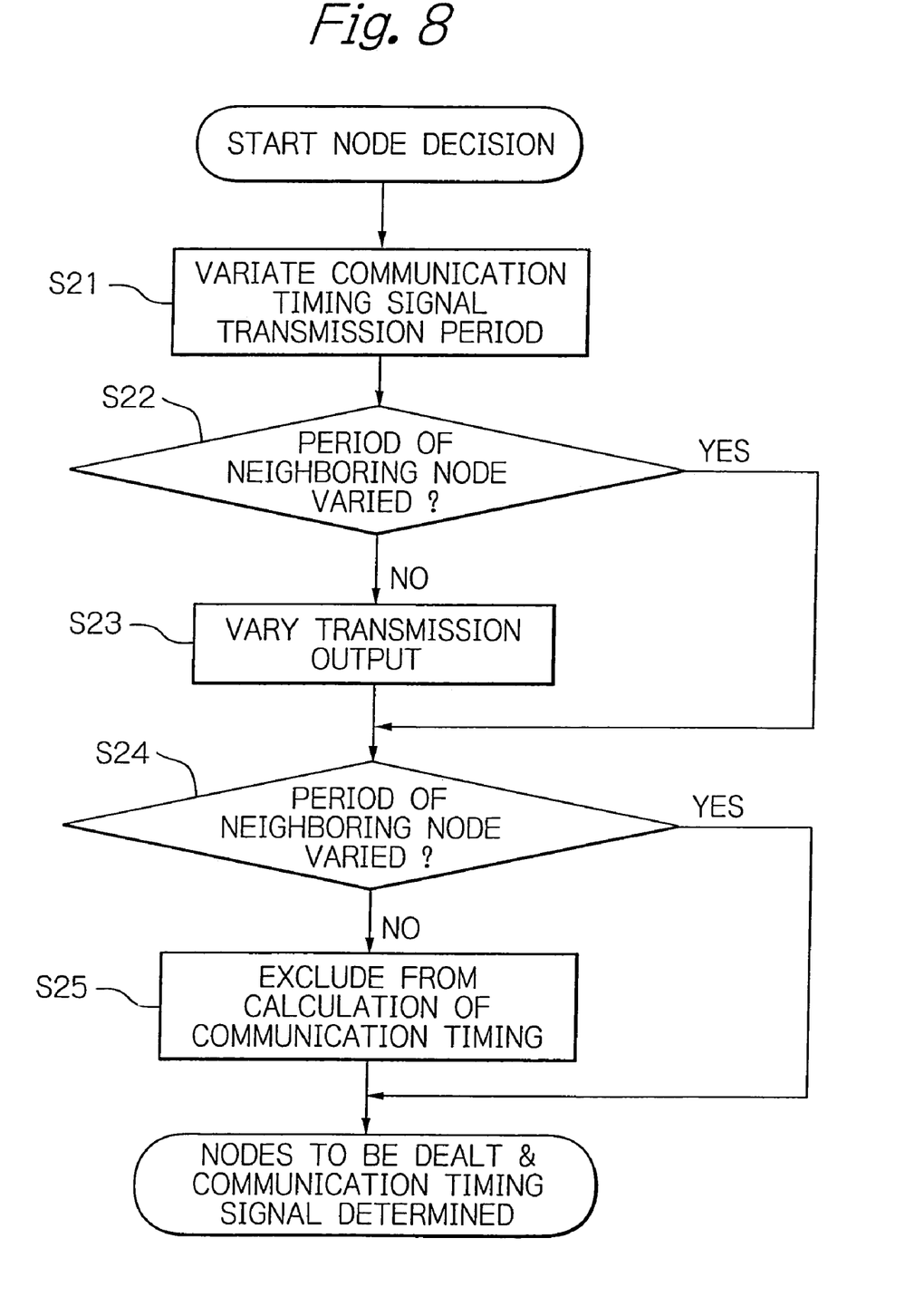
FIG. 8 is a flowchart demonstrating a specific communication timing control procedure available with the alternative embodiment.
Figure 9A:
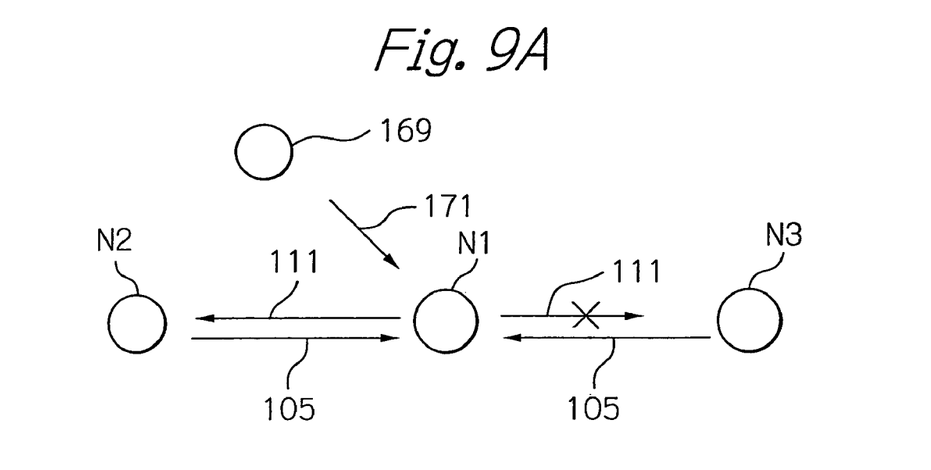
FIGS. 9A, 9B and 9C show specific relations between a plurality nodes included in the alternative embodiment as to the transmission/receipt of a communication timing signal.
Figure 9B:
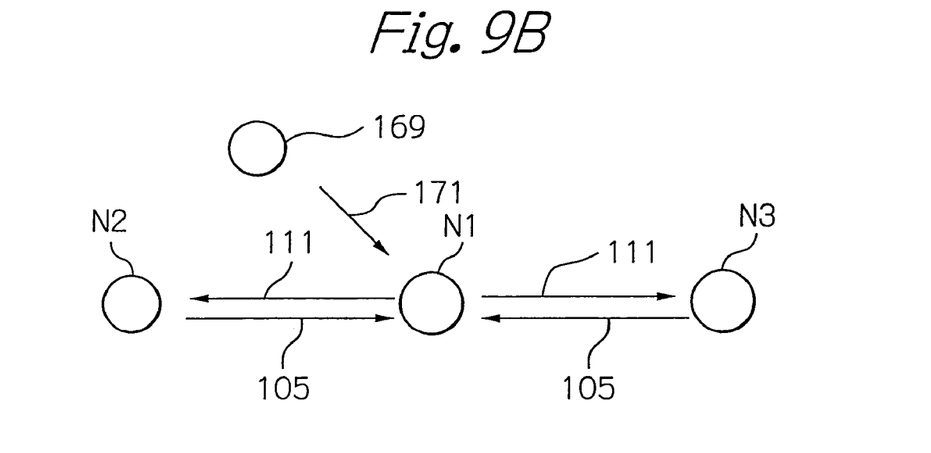
Figure 9C:
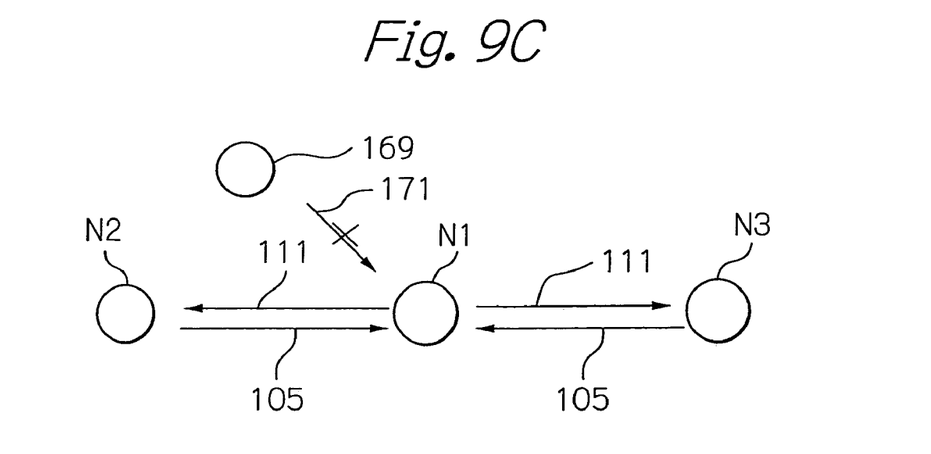

FIG. 8 is a flowchart demonstrating a specific communication timing control procedure available with the node 10B of the illustrative embodiment. FIGS. 9A, 9B and 9C each show a particular relation between the nodes N1, N2 and N3 for promoting the understanding of the procedure to be described hereinafter. As shown in FIG. 9A, assume that a communication timing signal 111 output from the node N1 is propagated to the node N2, but not up to the node N3 due to the influence of accuracy available with the individual node, an obstacle and so forth although communication timing signals 105 output from the nodes N2 and N3 are successfully propagated to the node N1. Also, assume that a noise source 169 is located in the vicinity of the terminals N1 through N3 and radiates periodical noise 171 different from communication timing signals 105, so that the nodes N1 through N3 erroneously regard the noise 171 as a communication timing signal 111 each.

First, the nodes N1 through N3 control the transmission timing of its data signal 117 with the other nodes by transmitting a communication timing signal 111. As soon as the transmission interval of the communication timing signal 111 becomes constant among the nodes N1 through N3 with the elapse of time t, i.e., reaches its stable state, a selective decision on the nodes to be dealt with as to the calculation of a communication timing starts being executed.

Figure 10A:
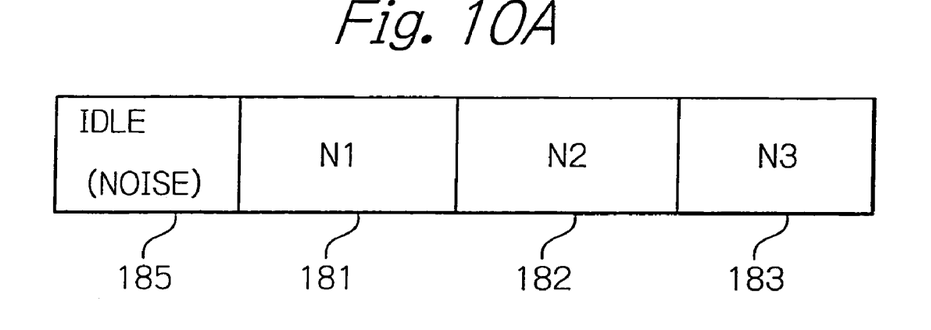
FIGS. 10A-10D show how time slots are allotted in the alternative embodiment, as seen from a given terminal.
Figure 10B:
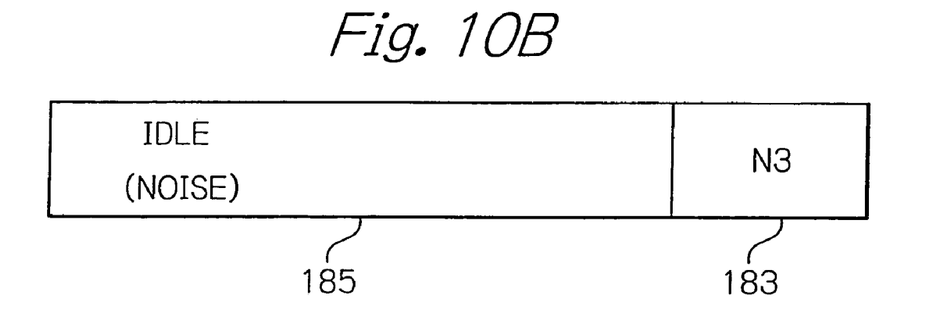

Assume that time slots 181, 182 and 183 assigned to the nodes N1, N2 and N3, respectively, in the stable state mentioned above have the width or duration thereof shown in FIG. 10A, as seen from the node N1. At this instant, an idle time slot 185 exists due to the noise 171 being radiated from the noise source 169. Also, as shown in FIG. 10B, the time slot 183 for the node N3 and an idle time slot 185 exist, as seen from the node N3.

As shown in FIG. 8, upon the start of the selective decision on the nodes to be dealt with, the communication timing calculator 151 varies the period of a communication timing signal 111 to be transmitted from the own node 10A (step S21). More specifically, the communication timing calculator 151 causes communication timing signals 111 to be transmitted at an interval produced by providing an interval calculated on a communication timing basis with the variation ΔT, which may be generated by a communication timing varying circuit corresponding to the circuit 15 as in the previous embodiment. In the illustrative embodiment, the variation ΔT should preferably be slightly greater than the variation ΔT of the previous embodiment because a greater variation ΔT allows whether or not any variation has occurred at the other nodes to be recognized more easily. Consequently, the transmission timing signal, transmitted at the constant interval of T in the stable state heretofore, will in turn be transmitted at the updated interval of T−ΔT or T+ΔT.

After the step S21, it is determined whether or not the receipt period of a transmission timing signal 105 received from a neighboring terminal is varied (step S22). At this time, the receipt history information circuit 161 is managing the history of the time lag information of a received timing signal 105 on a node-by-node basis. By referencing the receipt history information, the node decision circuit 163 compares time lag information having appeared one period before with time lag information of the current period for thereby determining whether or not the receipt period is varied on a node-by-node basis.

Why the illustrative embodiment confirms receipt periods from the other nodes by varying the transmission period of the own node is that so long as communication timing signals are accurately transmitted and received between the own node and the neighboring nodes, even the neighboring nodes, interacting with the own node by using the communication timing signals, are allowed to vary their transmission periods in accordance with the variation of the communication timing signal of the own node. That is, the receipt timings from the neighboring nodes are advanced if the transmission interval of the communication timing of the own node is decreased, or are delayed if it is increased.

On the other hand, if the answer of the step S22 is NO, meaning that the receipt frequency of any neighboring node is not varied, it may be determined that the communication timing signal of the own node is not propagated to the above neighboring node or that the neighboring node is not calculating a communicating timing based on the duration of receipt of a communication timing. More specifically, the procedure advances to a step S24 if the node decision circuit 163 determines that the receipt frequency of the neighboring node is varied (YES, step S22) or otherwise (NO, step S22) advances to a step S23.

For example, in the specific propagation relation of the communication timing signal depicted in FIG. 9A, when the node N1 varies the transmission period of the own communication timing signal, the node N2 increases the distance of its transmission timing from the transmission timing of the node N1 for thereby varying the transmission period. However, because the communication timing signal 111 from the terminal N1 does not reach the node N3, the transmission timing of a communication timing signal 105 from the node N3 does not vary. This is also true with the noise 171 being radiated form the noise source 169.

Figure 10C:
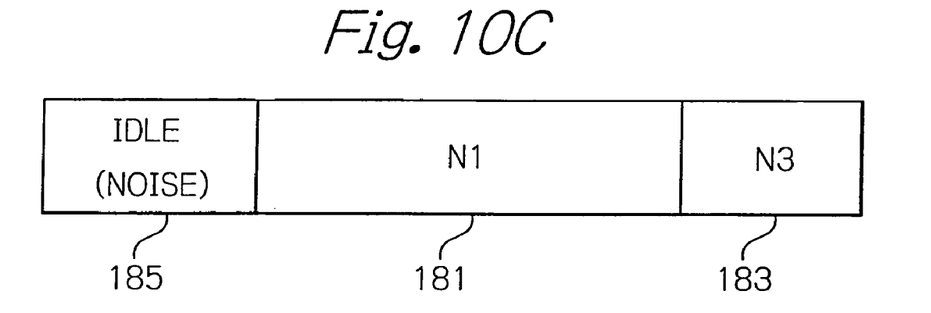

In the step S23, the communication timing signal transmitter 13 increases the transmission output of the transmission timing signal. For example, in FIG. 9A, the node N1, having determined that the receipt period of a communication timing signal 105 from the node N3 is not varied, increases the transmission output of the transmission timing signal 111 with the result that the communication timing signal 111 from the node N1 is successfully propagated to the node N3 also, as shown in FIG. 9B. As soon as the node N3 starts interacting with the node N1, time slots 181 and 183 are assigned to the terminals N1 and N3, respectively, as shown in FIG. 10C. At this stage, however, the idle time slot 185 ascribable to the noise 171 still exists.

While various methods are available for increasing the transmission output of a communication timing signal 111, there may be used a method that greatly raises the output level at once or a method that varies a predetermined level several steps at a time by repeating the steps S21 and S02 several consecutive times.

In the step S24, the node decision circuit 163 again confirms the receipt period of a communication timing signal on a neighboring node-by-node basis in order to determine whether or not the receipt periods of the communication timing signals 105 sent from all the neighboring steps vary. If the answer of the step S24 is YES, the node decision circuit 163 ends the decision on nodes to be dealt as to the calculation of a communication timing. If the answer of the step S24 is NO, the procedure advances to a step S25.

In the step S24 thus executed if there is any received signal that does not vary in period in response to the increase in the output of the communication timing signal 111 sent from the node N1, as stated above, the node decision circuit 163 determines that the above received signal is not a communication timing signal 105 particular to the network 30, but is noise 171, and excludes it from the calculation of a communication timing.

By referencing the time lag information of the noise 171 included in the receipt history information, the terminal decision circuit 163 discards a signal received in the same period of time as the noise since the transmission of a communication signal 111 from the own node. Also, the terminal decision circuit 163 changes the communication channel or adjusts the receipt sensitivity so as not to receive the noise 171.

Figure 10D:
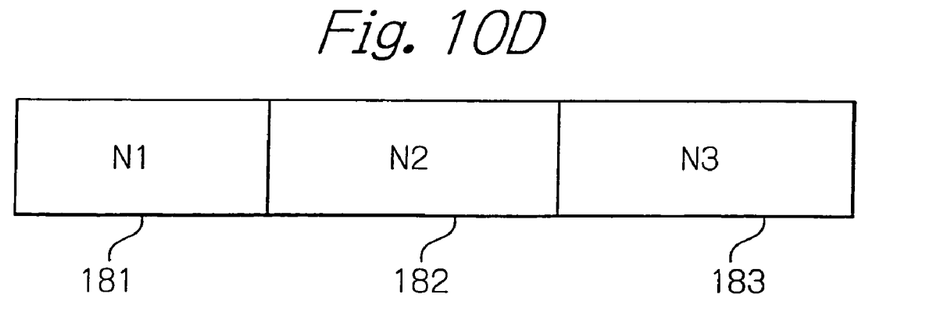

For example, in the condition shown in FIG. 9B, when the terminal decision circuit 163 of the node N1 excludes the signal from the noise source 169 from the calculation of a communication timing, a transmission/receipt relation shown in FIG. 9C is established. As a result, as shown in FIG. 10D, time slots 181, 182 and 183 are assigned to all the nodes N1, N2 and N3, respectively, as seen from the node N1.

It should be noted that the procedure described above does not have to be executed every period, but may be executed one time only when there occurs a time slot in which a signal, acknowledging the receipt of a data signal 117, is not returned from a neighboring node, i.e., the neighboring node does not receive a data signal 117.

The alternative embodiment achieves the following advantages in addition to the advantage of the previous embodiment. In the alternative embodiment, the transmission timing of a communication timing signal 111 from the own node is varied to see if any received communication timing signal 105 does not vary in period in unison. If such a received communication timing signal 105 exists, the output of the communication timing signal 111 is varied in order to realize accurate calculations of communication timings.

Further, in the alternative embodiment, the receipt timing signal 105 whose period does not vary in unison is regarded as noise 171 and excluded from the calculation of communication timings. This successfully increases the width of a slot to be allotted to each node.

In summary, it will be seen that the present invention allows a node to autonomously, surely transmit and receive communication timing control signals to and from neighboring nodes for thereby insuring accurate calculates of transmission timings.

The entire disclosure of Japanese patent application No. 2005-177944 filed on Jun. 17, 2005, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A communication control apparatus included in one of a plurality of nodes constituting a telecommunications system, said apparatus comprising:
    a communication timing signal transmitter/receiver for receiving a first communication timing signal representative of a transmission timing of a data signal from a neighboring one of the plurality of nodes which adjoins said one node, and transmitting a second communication timing-signal of said one node;
    a communication timing determining circuit for receiving a phase signal representative of a data transmission timing of the neighboring node in the first communication timing signal to vary a state of a phase of said one node according to a rule to thereby determine a transmission timing of the second communication timing signal in accordance with basic rate information and the first communication timing signal, the rule changing a rhythm of a nonlinear oscillation of the phase of said one node in response to an impulse signal in the first communication timing signal, the basic rate information defining a transmission timing of the second communication timing signal; and
    a basic rate information controller for controlling the basic rate information used by said communication timing determining circuit.

2. The apparatus in accordance with claim 1, wherein said basic rate information controller varies the basic rate information within a predetermined narrow range.

3. The apparatus in accordance with claim 1, further comprising a history managing circuit for managing a receipt period of the first communication timing signal received by said communication timing transmitter/receiver from the neighboring node as a history on a neighboring node-by-node basis.

4. The apparatus in accordance with claim 3, further comprising a receipt period confirming circuit for confirming, after said basic rate information controller has varied the basis rate information, a variation condition of the receipt period of the first communication timing signal of the neighboring node managed by said history managing circuit, said communication timing signal transmitter/receiver increasing a transmission output of the second communication timing signal of said one node when said receipt period confirming circuit determines that the receipt period of the communication timing signal of the neighboring node is not varied.

5. The apparatus in accordance with claim 4, further comprising a history managing circuit for managing a receipt period of the first communication timing signal received by said communication timing transmitter/receiver from the neighboring node as a history on a neighboring node-by-node basis, wherein when said receipt period confirming circuit determines that the receipt period of the first communication timing signal of the neighboring node is not varied over predetermined consecutive transmission periods, said history managing circuit excludes a receipt history of the first communication timing signal from calculation of communication timing.

6. A method of controlling communication in one of a plurality of nodes constituting a telecommunications system, said method comprising:

a communication timing signal transmitting/receiving step of receiving a first communication timing signal representative of a transmission timing of a data signal from a neighboring one of the plurality of nodes which adjoins said one node, and transmitting a second communication timing signal of said one node;

a communication timing determining step of receiving a phase signal representative of a data transmission timing of the neighboring node in the first communication timing signal to vary a state of a phase of said one node according to a rule to thereby determine a transmission timing of the second communication timing signal in accordance with basic rate information and the first communication timing signal, the rule changing a rhythm of a nonlinear oscillation of the phase of said one node in response to an impulse signal in the first communication timing signal, the basic rate information defining a transmission timing of the second communication timing signal; and a basic rate information controlling step of controlling the basic rate information used by said communication timing determining step.

7. A communication node forming a telecommunications system and including a communication control apparatus, said apparatus comprising:

a communication timing signal transmitter/receiver for receiving a first communication timing signal representative of a transmission timing of a data signal from a neighboring node neighboring said communication node, and transmitting a second communication timing signal of said communication node;

a communication timing determining circuit for receiving a phase signal representative of a data transmission timing of the neighboring node in the first communication timing signal to vary a state of a phase of said communication node according to a rule to thereby determine a transmission timing of the second communication timing signal in accordance with basic rate information and the first communication timing signal, the rule changing a rhythm of a nonlinear oscillation of the phase of said communication node in response to an impulse signal in the first communication timing signal, the basic rate information defining a transmission timing of the second communication timing signal; and a basic rate information controller for controlling the basic rate information used by said communication timing determining circuit.

8. A telecommunications system including a communication node, which comprises a communication control apparatus, said apparatus comprising:

a communication timing signal transmitter/receiver for receiving a first communication timing signal representative of a transmission timing of a data signal from a neighboring node neighboring said communication node, and transmitting a second communication timing signal of said communication node;

a communication timing determining circuit for receiving a phase signal representative of a data transmission timing of the neighboring node in the first communication timing signal to vary a state of a phase of said communication node according to a rule to thereby determine a transmission timing of the second communication timing signal in accordance with basic rate information and the first communication timing signal, the rule changing a rhythm of a nonlinear oscillation of the phase of said communication node in response to an impulse signal in the first communication timing signal, the basic rate information defining a transmission timing of the communication timing signal; and a basic rate information controller for controlling the basic rate information used by said communication timing determining circuit.

9. The apparatus in accordance with claim 2, wherein said basic rate information controller successively varies the basic rate information at random within the predetermined narrow range.

* * * * *

UNITED STATES PATENT AND TRADEMARK OFFICE
CERTIFICATE OF CORRECTION

| | | |
|---|---|---|
| PATENT NO. | : 7,660,325 B2 | Page 1 of 1 |
| APPLICATION NO. | : 11/452904 | |
| DATED | : February 9, 2010 | |
| INVENTOR(S) | : Toshihiko Matsunaga | |

It is certified that error appears in the above-identified patent and that said Letters Patent is hereby corrected as shown below:

Title Page, Item 75 (Inventor)

"Tokyo" should be changed to --Osaka--

Signed and Sealed this

Sixteenth Day of November, 2010

David J. Kappos
*Director of the United States Patent and Trademark Office*

UNITED STATES PATENT AND TRADEMARK OFFICE
CERTIFICATE OF CORRECTION

PATENT NO. : 7,660,325 B2
APPLICATION NO. : 11/452904
DATED : February 9, 2010
INVENTOR(S) : Toshihiko Matsunaga It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 870 days.

Signed and Sealed this

Thirtieth Day of November, 2010

David J. Kappos
*Director of the United States Patent and Trademark Office*